United States Patent

Sugitani

[11] Patent Number: 6,134,962
[45] Date of Patent: *Oct. 24, 2000

[54] ANGULAR VELOCITY DETECTING APPARATUS OF A VIBRATION TYPE

[75] Inventor: Nobuyoshi Sugitani, Toyota, Japan

[73] Assignee: Toyota Jidosha Kabushiki Kaisha, Toyota, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/891,277

[22] Filed: Jul. 10, 1997

[30] Foreign Application Priority Data

Aug. 12, 1996 [JP] Japan .................................. 8-212615

[51] Int. Cl.[7] .................................................. G01P 9/04
[52] U.S. Cl. .............................. 73/504.16; 73/504.02; 310/329
[58] Field of Search ..................... 310/333, 321, 310/329, 367; 73/504.02, 504.12, 504.14, 504.16

[56] References Cited

U.S. PATENT DOCUMENTS

| | | | |
|---|---|---|---|
| Re. 32,931 | 5/1989 | Staudte | 73/504.16 |
| 4,628,734 | 12/1986 | Watson | 73/504.16 |
| 4,654,663 | 3/1987 | Alsenz et al. | 73/505 |
| 5,056,366 | 10/1991 | Fersht | 73/504.12 |
| 5,166,571 | 11/1992 | Konno | 73/514.16 |
| 5,396,144 | 3/1995 | Gupta | 73/504.16 |
| 5,481,913 | 1/1996 | Ito et al. | 73/504.16 |
| 5,585,562 | 12/1996 | Kurata | 73/504.16 |
| 5,635,642 | 6/1997 | Nonomura et al. | 73/504.16 |

FOREIGN PATENT DOCUMENTS

| | | |
|---|---|---|
| 0 649 002 A1 | 4/1995 | European Pat. Off. . |
| 0 715 148 A1 | 6/1996 | European Pat. Off. . |
| 0 809 087 A2 | 11/1997 | European Pat. Off. . |
| 3291517A | 12/1991 | Japan . |
| 755479A | 3/1995 | Japan . |
| 2 158 579 | 11/1985 | United Kingdom . |

*Primary Examiner*—Helen C. Kwok
*Attorney, Agent, or Firm*—Kenyon & Kenyon

[57] ABSTRACT

To suppress dispersion of detection sensitivity due to a change in ambient temperature in a vibration type angular velocity detecting apparatus. An angular velocity detecting apparatus comprising a vibrator, excitation means for exciting the vibrator, detecting means for detecting an amplitude of vibration based on Coriolis' force occurring with rotation of the vibrator excited to vibrate by the excitation means, and angular velocity calculating means for calculating an angular velocity of the rotation from a magnitude of the amplitude detected by the detecting means, wherein in an X, Y, and Z, three-dimensional, orthogonal coordinate space, the vibrator has a vibrator base extending in the X-direction on the XY plane, two first vibrating bars projecting in the direction of +Y from the vibrator base and at substantially symmetric positions with respect to a Y-directional axis passing a central portion of the vibrator base, two second vibrating bars projecting in the direction of −Y from the vibrator base and at the same X-directional positions as the two first vibrating bars, and a single supporting rod having prescribed torsional rigidity, projecting from the central portion of the vibrator base, and fixed at the tip thereof to a body to be detected.

14 Claims, 6 Drawing Sheets

↙ ELECTRIC FIELD

← EFFECTIVE ELECTRIC FIELD

ANGULAR VELOCITY DETECTING APPARATUS OF A VIBRATION TYPE

BACKGROUND OF THE INVENTION

1. Field of the Invention

The present invention relates to an angular velocity detecting apparatus used in navigation systems or posture control of an automobile and, more particularly, to an angular velocity detecting apparatus of a vibration type.

2. Related Background Art

There are conventionally known angular velocity detecting apparatuses of the vibration type utilizing the phenomenon that when a vibrating body is subjected to rotation, a new vibration according to the angular velocity of the rotation occurs due to Coriolis' force. An example of an angular velocity detecting apparatus is a rotational velocity sensor, for example, as described in the bulletin of Japanese Laid-open Patent Application No. Hei 7-55479. A vibrator used in this rotational velocity sensor has a structure that in the XY plane two excitation branches project in the direction of +Y from one side of a rectangular frame and two pickup branches project in the direction of −Y from the opposite side of the frame. In this structure, when the excitation branches are excited to vibrate in the X-directions, the excitation branches also vibrate in the Z-directions because of the Coriolis' force occurring with rotation of the vibrator. This vibration in the Z-directions (in the directions normal to the XY plane) is transmitted to the pickup branches. In the pickup branch side, this Z-directional vibration thus transmitted is detected and the angular velocity of rotation of the vibrator is derived from a detection result.

This prior art vibrator has a mounting base inside the frame and the mounting base is linked with the frame by cross bridges disposed between the mounting base and either side of the frame on which the excitation branches or the pickup branches are provided. This vibrator is fixed to a body to be detected by mounting the mounting base to a stator fixed to the body to be detected. When parts of the vibrating bars are fixed, vibration of the vibrating bars is decreased. This is because the vibration propagates to the stator, and this propagation of vibration is called leakage of vibration. The higher the fixing strength between the vibrating bars and the stator, the greater the leakage of vibration. However, the above prior art rotational velocity sensor gives flexibility to the fixing strength by the above-stated structure of the vibrator, thereby preventing energy of the Z-directional vibration of the vibrating bars from leaking through the frame to the stator. Thus suppressed is degradation of detection accuracy due to the leakage of vibration.

SUMMARY OF THE INVENTION

However, since this prior art vibrator is constructed in such an arrangement that mounting base and the frame are fixed to each other by two cross bridges, i.e., at two positions, a temperature change causes tensile stress or compressive stress to be applied to each of the frame, cross bridges, and mounting base. This stress changes the fixing strength between the frame and the mounting base, which also changes an amount of leakage of vibration. As a result, there is a problem that the sensitivity of detection of angular velocity has dispersion based on the change in ambient temperature.

The angular velocity detecting apparatus of the present invention was achieved for solving the above problem, and in an X, Y, and Z, three-dimensional, orthogonal coordinate space, the vibrator thereof has a vibrator base extending in the X-direction on the XY plane, two first vibrating bars projecting in the direction of +Y from the vibrator base and at substantially symmetric positions with respect to a Y-directional axis passing a central portion of the vibrator base, two second vibrating bars projecting in the direction of −Y from the vibrator base and at the same X-directional positions as the two first vibrating bars do, and a single supporting rod having prescribed torsional rigidity, projecting from the central portion of the vibrator base, and fixed at the tip thereof to a body to be detected.

In this vibrator, the fixing strength of the vibrator to the body to be detected is determined by torsional rigidity of the supporting rod. Since in this vibrator the torsional rigidity of the supporting rod is adjusted at the prescribed value, the leakage of vibration from the supporting rod is regulated, so that the detection sensitivity is adjusted. Since the vibrator base is linked at one position with the supporting rod fixed to the body to be detected, expansion or contraction of each element of the vibrator based on the change in the ambient temperature does not give rise to the stress to be applied from the supporting rod onto the vibrator base. Therefore, since the torsional rigidity of the supporting rod does not vary, the leakage amount of the vibration transmitted through the vibrator base to the supporting rod is not affected by the temperature change.

The angular velocity detecting apparatus of the present invention can be constructed in such a way that the supporting rod of the vibrator projects in the direction of −Y from the vibrator base and that the excitation means excites and vibrates the first vibrating bars in the X-directions. With this construction, the excitation of vibration forms a stress concentration portion between the two first vibrating bars on the first vibrating bar side of the vibrator base, but the stress concentration portion is apart from the supporting rod, because the supporting rod is disposed on the second vibrating bar side of the vibrator base. Therefore, this construction does not give rise to a phenomenon that the vibration stress of excitation of the first vibrating bars vibrates the supporting rod in the X-directions because of positional deviation between the supporting rod and the two first vibrating bars, or the like. In addition, since the supporting rod does not impede transmission of vibration between the two first vibrating bars, no reduction occurs in the Q value. Further, the detection accuracy is stable, because the vibration leakage through the supporting rod is not affected by the stress due to excitation.

When the vibrator base and the first and second vibrating bars are made of a single equal-thickness substrate, it is possible to make the first vibrating bars and the second vibrating bars coupled with each other as to the vibration in the directions normal to the substrate, i.e., in the Z-directions, while not coupled in the X-directions, by adjusting the X-directional width of each of the first vibrating bars and the second vibrating bars. If the substrate is made of a quartz single-crystal plate, because the substrate itself is a piezoelectric material, the excitation can be achieved by simply applying the voltage with periodically changing polarities thereto in a predetermined direction, and vibration can be detected by simply detecting change of polarization occurring with the vibration.

One aspect of the angular velocity detecting apparatus of the present invention comprises a metallized substrate comprising a wire for excitation to connect a circuit section of the excitation means with an electrode for excitation provided on the first or second vibrating bars, and a wire for detection to connect a circuit section of the detecting means with an electrode for detection provided on said first or second vibrating bars, wherein the tip of the supporting rod is welded to the metallized substrate and wherein the metallized substrate is fixed to the body to be detected.

Since the wires of the metallized substrate are baked, the wires are not damaged even by welding of the supporting rod.

When the vibrator is surrounded by an equipotential, electroconductive material, it becomes free of influence of electromagnetic noise.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENT

Figure 1A:
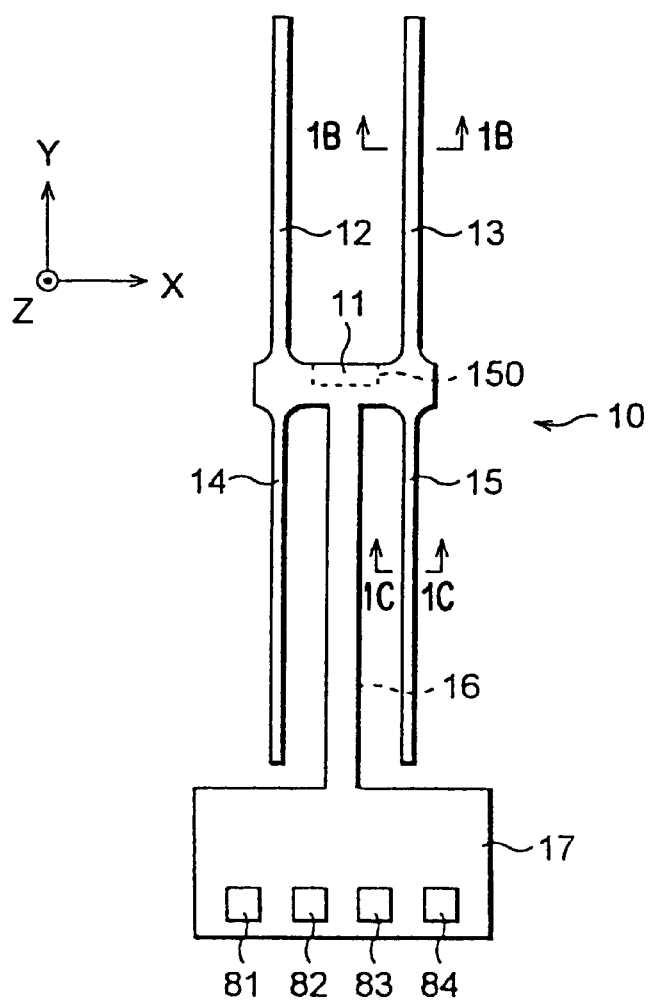
FIG. 1A is a plan view to show the vibrator of the angular velocity detecting apparatus which is an embodiment of the present invention.

FIG. 1A is a plan view to showing the vibrator 10 in an embodiment of the angular velocity detecting apparatus of the present invention. In this figure, the X-axis is taken along the horizontal direction with the positive direction being directed to the right, the Y-axis is taken in the vertical direction with the positive direction being directed up, and the Z-axis is taken along the direction normal to the plane of the figure with the positive direction being directed out of the plane of the figure. The vibrator 10 is constructed in an integral form of a single-crystal substrate of quartz as composed of vibrator base 11 extending in the X-axis direction, first vibrating bars 12 and 13 for excitation extending in the direction of +Y from the vibrator base 11, second vibrating bars 14 and 15 for detection extending in the direction of −Y coaxially with the respective first vibrating bars 12 and 13 from the vibrator base 11, supporting rod 16 extending in the direction of −Y from the vibrator base 11 between the second vibrating bars 14 and 15, and fixed plate 17 provided at an end of the supporting rod 16.

The crystallographic axes of quartz will be described briefly herein. Natural quartz is normally a columnar crystal, wherein the vertical center axis of this columnar crystal, i.e., the <0001> crystal axis is defined as the Z-axis or as the optic axis and a line normally intersecting with each surface of the columnar crystal as passing the Z-axis is defined as the Y-axis or as the mechanical axis. Further, a line being perpendicular to the vertical ridges of this columnar crystal as passing the Z-axis is defined as the X-axis or as the electric axis.

The single-crystal substrate used for the vibrator 10 is a substrate called a Z plate, which is a single-crystal substrate cut out along planes normal to or approximately normal to the Z-axis. In the present embodiment, therefore, the Z-axis of crystallographic orientation is coincident with the above-stated Z-axis to indicate the direction of arrangement of the vibrator 10 on the drawing. There are three sets of the X-axis and the Y-axis of quartz orthogonal to each other, one of which is coincident with the X-axis and the Y-axis to indicate the directions of arrangement of the vibrator 10 on the drawing. This relation between the crystallographic orientations and the directions of the vibrator 10 is also applied in the other embodiments described hereinafter. Although the quartz used for the vibrator 10 is artificial quartz, the structure thereof is the same as natural quartz.

The first vibrating bars 12 and 13 are formed in the same size and the both are used as vibrating bars for excitation in the present embodiment. The second vibrating bars 14 and 15 are also formed in the same size and the both are used as vibrating bars for detection. The second vibrating bars 14 and 15 are more slender and longer than the first vibrating bars 12 and 13, so that the X-directional natural frequency $f_{X1}$ of the first vibrating bars 12, 13 is different from the X-directional natural frequency $f_{X2}$ of the second vibrating bars 14, 15. The Z-directional natural frequencies of the first vibrating bars and the second vibrating bars are also different from each other, but, because the Z-directional vibration is coupled vibration of the first vibrating bars and the second vibrating bars, coupled natural frequency $f_Z$ exists. The coupled vibration is little as to the X-directional vibration, because the transmission rate of vibration between the first vibrating bars and the second vibrating bars is very low. The arrangement wherein the first vibrating bars and the second vibrating bars are not coupled as to the X-directional vibration while the first vibrating bars and the second vibrating bars are coupled as to the Z-directional vibration in this way is due to the shape wherein the whole of the vibrator 10 is integrally made of the very thin quartz substrate and wherein the Y-directional width of the vibrator base 11 is sufficiently wider than the thickness of the quartz substrate. In the present embodiment, such adjustment is effected that the values of the X-directional natural frequency $f_1$ of the first vibrating bars 12, 13 and the coupled natural frequency $f_Z$ are very close to each other.

Figure 1B:
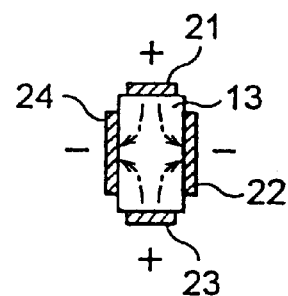
FIG. 1B is a cross-sectional view along B—B of FIG. 1A.
Figure 1C:
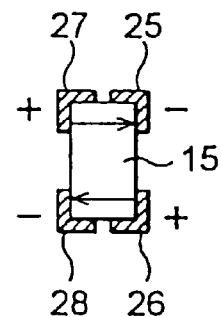
FIG. 1C is a cross-sectional view along C—C of FIG. 1A.

Each vibrating bar is provided with electrodes according to its purpose. Specifically, the first vibrating bars 12 and 13 are provided with electrodes for excitation while the second vibrating bars 14 and 15 are provided with electrodes for detection. The arrangement of electrodes is omitted in FIG. 1A in order to avoid microscopic illustration of drawing, but, instead thereof, it is illustrated using FIGS. 1B and 1C. FIGS. 1B and 1C are a cross-sectional view along B—B and a cross-sectional view along C—C, respectively, in FIG. 1A. As illustrated, the first vibrating bar 13 is provided with electrodes 21 to 24 respectively on the four faces, the upper face, the lower face, and the side faces, which extend from the connection part with the vibrator base 11 toward the tip of the first vibrating bar 13, i.e., in the direction of +Y and through the length of approximately ⅔ to ¾ of the total length of vibrating bar. The first vibrating bar 12 is also provided with electrodes 31 to 34 (see FIG. 3) similarly. On the other hand, the second vibrating bar 15 is provided with four electrodes 25 to 28 as covering the four corners of the rectangular cross section, i.e., the ridges, which extend from the connection part with the vibrator base 11 toward the tip of the second vibrating bar 15, i.e., in the direction of −Y and through the length of approximately ⅔ to ¾ of the total length of vibrating bar. The second vibrating bar 14 is also provided with electrodes 35 to 38 (see FIG. 3) similarly.

Each electrode is of double-layered structure of chromium and gold, which is obtained by evaporating these metals onto the surface of vibrator 10 and thereafter properly dividing and patterning the layers in the desired shape by the photolithography technology. Each electrode is electrically connected to either one of bonding pads 81 to 84 provided on the fixed plate 17 and is further connected therefrom to a signal processing circuit described hereinafter. A wire between each electrode on the vibrating bar and the bonding pad is made on the surface of supporting rod 16 by the film-forming technology, though not illustrated.

Figure 2A:
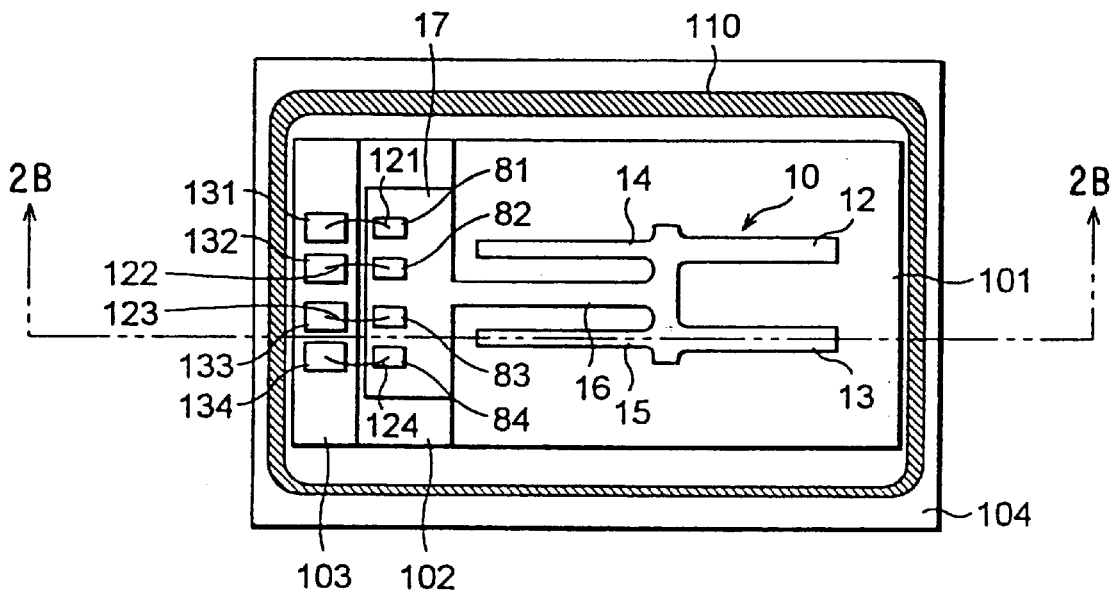
FIG. 2A is the drawing to show the state in which the vibrator is mounted on the metallized substrate and packaged.
Figure 2B:
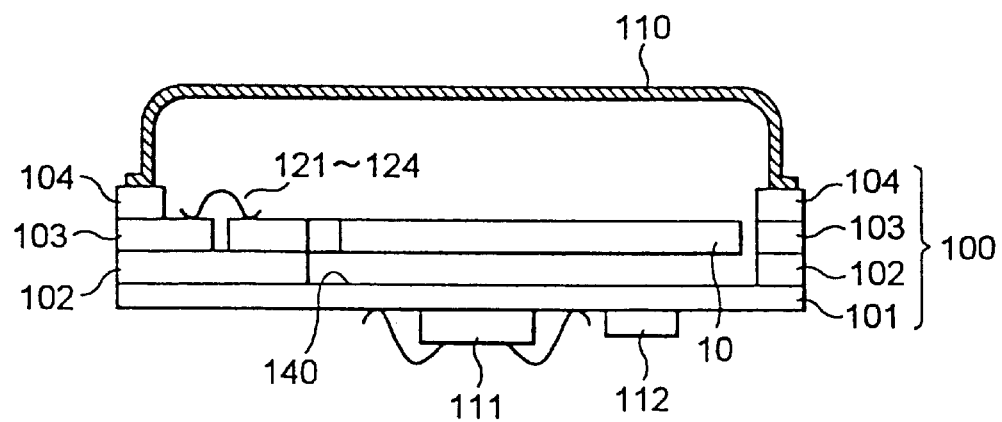
FIG. 2B is a sectional view taken along a line A—A in FIG. 2A.

FIGS. 2A and 2B includes figures to show the state wherein the vibrator 10 is mounted on a four-layered, metallized substrate 100 and wherein it is sealed in by a metal lid 110. FIG. 2A is a plan view and FIG. 2B is a side view.

The metallized substrate is a multi-layered wire substrate of ceramic normally fabricated by printing the wires, bonding pads, etc. with the metal of tungsten, molybdenum, or the like on a green sheet of 90% $SiO_2$ (raw state), stacking such sheets in multiple layers, then pressing the stack, thereafter drying it, and baking it. The wires of the respective layers are connected by connection holes called as via holes. This metallized substrate, in the raw state (in the state of green sheet), is easy to hollow, and it is thus easy to fabricate a substrate with a surface having steps. Since each layer is subjected to press working and baking and since the via holes are filled with the metal of tungsten, molybdenum, or the like, airtightness is fully maintained between the layers. Further, since the high-melting-point metal such as tungsten or molybdenum is used for the wires, a variety of mounted components can be brazed at high temperatures without affecting these wires.

The metallized substrate 100 is formed in the four-layered structure, wherein circuit elements 111, 112 for performing excitation, detection of vibration, and calculation of angular velocity or the like are formed on the back surface of first layer 101 being the lowermost layer. Second layer 102, third layer 103, and fourth layer 104 are stacked in this order on the first layer 101. Each of the second layer 102, third layer 103, and fourth layer 104 is hollowed in a rectangular shape at the central portion thereof and lengths of apertures thereof in the longitudinal direction (in the horizontal direction of FIGS. 2A and 2B are determined to be longer in order. As illustrated, the right sides of the layers are aligned, whereby the left sides are stepped.

The fixed plate 17 of the vibrator 10 is welded and fixed by soldering on the second layer 102 at the stepped portion of this metallized substrate 100 and the bonding pads 131 to 134 are provided on the surface of the third layer 103. The bonding pads 131 to 134 are connected respectively through the wires and via holes of the respective layers, not illustrated, to the circuit elements 111 and 112. Since the fixed plate 17 of the vibrator 10 is welded onto the second layer 102, the vibrating bars 12 to 15 can be kept in a floating state from the first layer 101. Since the bonding pads 131 to 134 on the metallized substrate 100 side are not provided on the second layer 102, but are provided on the third layer 103, a level difference from the bonding pads 81 to 84 of the vibrator 10 is relaxed, which facilitates the connection work of bonding wires 121 to 124.

The lower edge of metal lid 110 is bonded to the fourth layer 104 throughout the entire periphery thereof with a sealing resin. The bonding with the sealing resin may be replaced by bonding by brazing like soldering. This completely shuts off the space containing the vibrator 10 from the outside. This internal space is evacuated to a vacuum, so as to cause no loss of vibrational energy of vibrator 10 through air.

The whole of the upper surface 140 of the first layer 101 is covered by a metal film and this metal film is electrically connected through the via holes with the metal lid 110. Accordingly, the most of the space containing the vibrator is covered by the equipotential metal, thereby being electromagnetically shielded. Operational amplifiers are used in the detecting circuit etc. described hereinafter and amplification at high amplification rate is carried out thereby. In general, amplifiers with high amplification rate are weak against electromagnetic noise and, especially, it is necessary to prevent the noise from intruding thereinto from the device section being the input end thereof. The electromagnetic shield is effective in such prevention of noise intrusion. Mutually opposite electrodes among the electrodes provided on each vibrating bar compose a capacitor and the angular velocity is calculated from a change in a charge amount thereof as described below. Since this charge amount is affected by the electromagnetic noise from the outside, the electromagnetic shield surrounding the vibrator 10 is also effective in order to suppress influence thereof. If wiring is made on the surface 140 of the first layer 101, the metal layer for electromagnetic shield will be deposited except for the wiring portions so as to avoid contact with the wiring.

Figure 3:
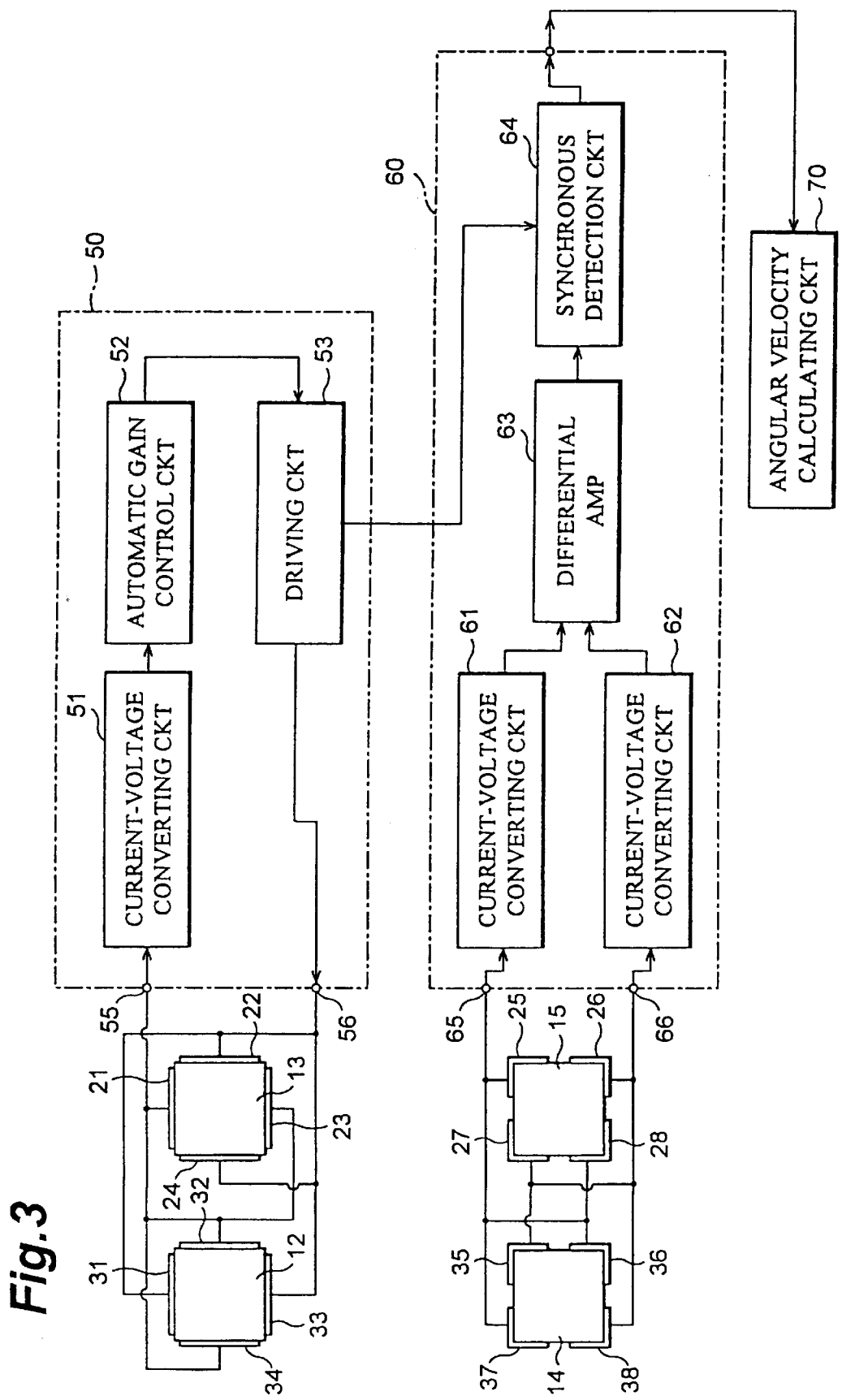
FIG. 3 is a block diagram to show the excitation circuit 50, detecting circuit 60, and angular velocity calculating circuit 70 used in the angular velocity detecting apparatus of the first embodiment and to show the connection relation of these circuits with the electrodes 21 to 28 and 31 to 38 provided on the vibrating bars 12 to 15.
Figure 4A:
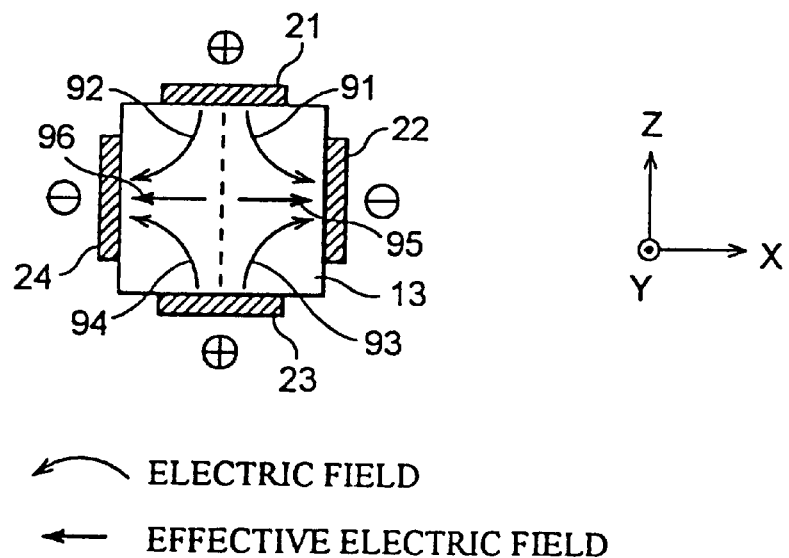
FIG. 4A is a sectional view for explaining the inverse piezoelectric effect in the first vibrating bars 12 and 13.
Figure 4B:
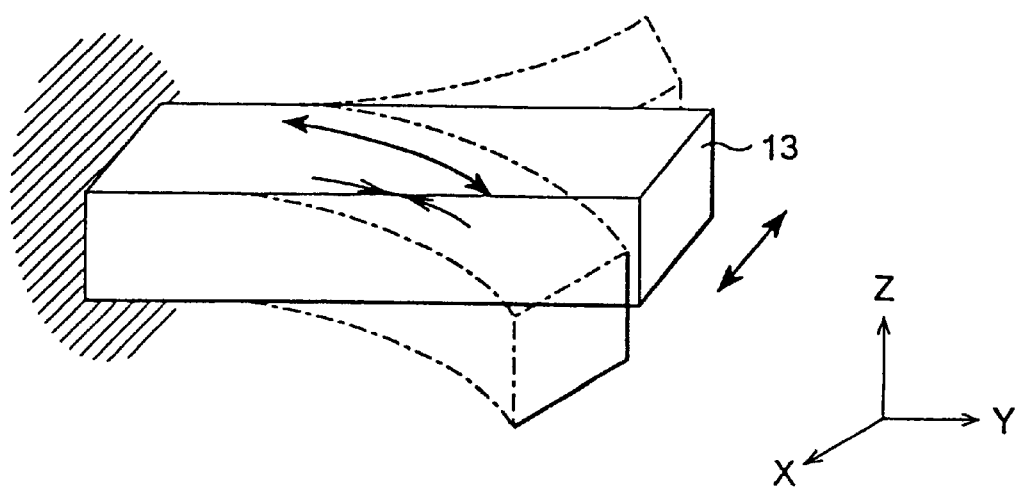
FIG. 4B is a bird's-eye view for explaining the inverse piezoelectric effect in the first vibrating bars 12 and 13.
Figure 5A:
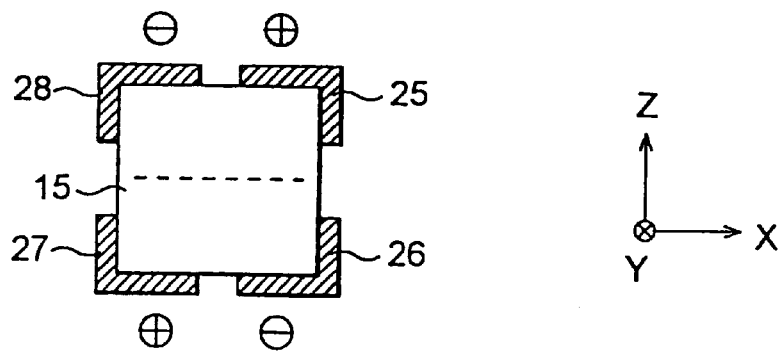
FIG. 5A is a sectional view for explaining the piezoelectric effect in the second vibrating bars 14 and 15.
Figure 5B:
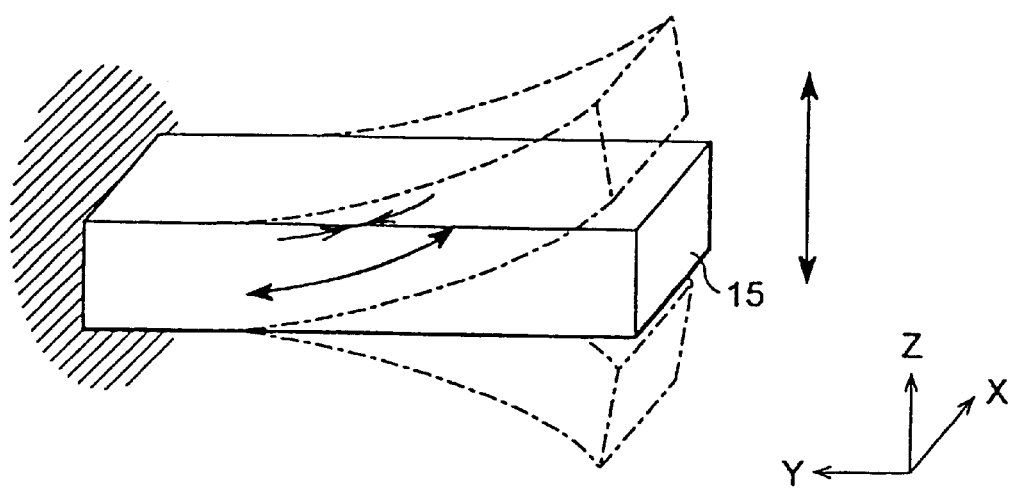
FIG. 5B is a bird's-eye view for explaining the inverse piezoelectric effect in the first vibrating bars 14 and 15.

Next described are processing circuits for performing excitation, detection, and calculation of angular velocity, mounted in the circuit elements 111 and 112. FIG. 3 is a block diagram to show excitation circuit 50, detecting circuit 60, and angular velocity calculating circuit 70 and to show the connection relation between these circuits and the electrodes 21 to 28 and 31 to 38 provided on the vibrating bars 12 to 15. FIGS. 4A and 4B are diagrams for explaining the inverse piezoelectric effect in the first vibrating bars 12 and 13 and FIGS. 5A and 5B are diagrams for explaining the piezoelectric effect in the second vibrating bars 14 and 15.

The excitation circuit 50 has current-voltage converting circuit 51, automatic gain control circuit 52, and driving circuit 53 and the detecting circuit 60 has current-voltage converting circuits 61 and 62, differential amplifier 63, and synchronous detection circuit 64.

The driving circuit 53 is a circuit for outputting a pulse wave as an excitation signal having the amplitude according to an output voltage value of the automatic gain control circuit 52 and the predetermined repetition cycles and also for outputting, as a detection signal for the synchronous detection circuit 64, a signal with shift of phase of 90° from the output signal, and the output terminal thereof is connected in common to the electrodes 22, 24 on the side faces of the first vibrating bar 13 and to the electrodes 31, 33 on the upper and lower faces of the first vibrating bar 12 via the terminal 56. The remaining electrodes 21, 23, 32, 34 on the first vibrating bars 12 and 13 are connected in common to the input terminal of the current-voltage converting circuit 51 via the terminal 55, so as to be fixed at an intermediate potential of the pulse wave output from the driving circuit 53.

FIGS. 4A and 4B are for explaining the excitation operation of the first vibrating bars by this excitation circuit 50, wherein FIG. 4A is a cross-sectional view obtained by cutting the first vibrating bar 13 by the ZX plane, which is a figure comparable to FIG. 1B. FIG. 4B is a perspective view to show the deflection action of the first vibrating bar 13. As described above, because the electrodes 21 and 23 are connected in common to the terminal 55 and the electrodes 22 and 24 are connected in common to the terminal 56, when an output pulse of the driving circuit 53 is of a low level, the voltages as shown in FIG. 4A are given to the respective electrodes, i.e., a relatively negative voltage to the electrodes 22 and 24 while a positive voltage to the electrodes 21 and 23. When the output pulse from the driving circuit 53 is of a high level, the opposite polarities thereto are given.

Now, considering the state wherein the voltages as shown in FIG. 4A are applied, the electric field as indicated by arrows 91 to 94 is given inside the vibrating bar 13. On the other hand, since the piezoelectric effect of quartz does not appear in the Z-axis directions, the effective electric field to affect the piezoelectric effect is the one indicated by arrows 95 and 96. Because of the inverse piezoelectric effect, the crystal of quartz expands in the Y-axis directions with application of the electric field in the positive direction of the X-axis, while it contracts in the Y-axis directions with application of the electric field in the negative direction of the X-axis.

Accordingly, in the state of FIG. 4A, the electrode 24 side of the vibrating bar 13 contracts while the electrode 22 side expands, whereby the vibrating bar 13 bends with the electrode 24 inside. With inversion of the polarities of the applied voltages to the electrodes 21 to 24, the vibrating bar 13 bends with the electrode 22 inside by the same principle. Therefore, when a pulse signal of a predetermined frequency is applied from the driving circuit 53 to the electrodes 22, 24 with fixing one end of the vibrating bar 13, the vibrating bar 13 vibrates in the X-directions as shown in FIG. 4B.

Since the present embodiment is arranged so that the upper and lower electrodes 21 and 23 of the vibrating bar 13 and the left and right electrodes 32 and 34 of the vibrating bar 12 are connected in common and the left and right electrodes 22 and 24 of the vibrating bar 13 and the upper and lower electrodes 31 and 33 of the vibrating bar 12 are connected in common as shown in FIG. 3, the vibrating bars 12 and 13 vibrate in mutually opposite phases in the X-directions.

X-directional vibration information of the first vibrating bars 12 and 13 are fed back through the current-voltage converting circuit 51 and the automatic gain control circuit 52. The current-voltage converting circuit 51 is a circuit for converting a change amount of charge generated in the electrodes 21, 23, 32, 34 by the piezoelectric effect with bend of the first vibrating bars 12 and 13, to a voltage value.

The automatic gain control circuit 52 receives the voltage signal output from the current-voltage converting circuit 51 and operates so as to decrease an output voltage value thereof with increase in an input voltage value thereto and to increase the output voltage value with decrease in the input voltage value. Thus, as the amplitude of vibration of the first vibrating bars 12 and 13 increases, the charge generated in the electrodes 21, 23, 32, 34 also increases, whereby the output voltage of the current-voltage converting circuit 51 also increases. This lowers the output voltage value of the automatic gain control circuit 52, so that the amplitude of the output pulse from the driving circuit 53 becomes smaller. In this way, the amplitude of the pulse signal output from the driving circuit 53 is subjected to the feedback control, and the amplitude of vibration of the first vibrating bars 12 and 13 is always kept stable.

Next described is the detecting circuit 60 for detecting the Z-directional vibration of the second vibrating bars as shown in FIGS. 5A and 5B. When the second vibrating bar 15 vibrates in the Z-directions and bends in the direction of +Z as shown in FIG. 5B, the upper half of the vibrating bar 15 contracts in the Y-direction, while the lower half expands in the Y-direction. Because of the piezoelectric effect of quartz, X-directional dielectric polarization occurs with Y-directional contraction, while opposite X-directional dielectric polarization occurs with Y-directional expansion. Since strength of dielectric polarization depends upon the magnitude of expansion or contraction, the polarization appears strong in the upper surface or in the lower surface, and it becomes weaker toward the intermediate portion.

Accordingly, the dielectric polarization appears as concentrated at the four corners of the vibrating bar 15, so that this dielectric polarization results in gathering the positive or negative charge as illustrated at each electrode 25 to 28 provided at the corner. Namely, the electrodes 25 and 27 will have the same polarity and the polarity of these becomes opposite to that of the electrodes 26 and 28. When the vibrating bar 15 is deflected downward, the opposite polarities to those described above appear based on the same principle.

The detecting circuit 60 detects a change amount of charge in each electrode of the vibrating bar 15 generated as described above and outputs a signal according to the amplitude of vibration of the second vibrating bar. Since the present embodiment is arranged so that the first vibrating bars 12, 13 are excited in mutually opposite phases in the X-directions and so that the first vibrating bars and the second vibrating bars are vibrated in mutually opposite phases in the Z-directions, the second vibrating bars 14 and 15 vibrate in mutually opposite phases in the Z-directions. This Z-directional vibration of the second vibrating bars 14, 15 is combined vibration of a component of leakage where X-directional excitation vibration of the first vibrating bars 12, 13 leaks as Z-directional vibration with a component generated based on the Coriolis' force appearing with rotation of the vibrator 10, but the phases of vibration of the second vibrating bars 14 and 15 in either case become opposite to each other. The details of generating mechanism of the Z-directional vibration based on the Coriolis' force will be described later, but the opposite-phase vibration of the left and right vibrating bars is generated in the Z-directions in any event. Thus, as shown in FIG. 3, the electrodes 25 and 28 of the second vibrating bar 15 and the electrodes 36 and 37 of the second vibrating bar 14 located at plane-symmetric positions therewith are connected in common to be further connected to the terminal 65 of the detecting circuit 60. The remaining electrodes 26, 27, 35, 38 are connected in common to the terminal 66 of the detecting circuit 60.

The current-voltage converting circuit 61 is a circuit for amplifying the change amount of charge in the electrodes 25, 28, 36, 37 to convert it to a voltage value and the current-voltage converting circuit 62 is a circuit for amplifying the change amount of charge in the electrodes 26, 27, 35, 38 to convert it to a voltage value. The differential amplifier 63 is a circuit for receiving the output signals of the respective current-voltage converting circuits 61 and 62 and for amplifying a potential difference between the two signals, and a change in the amplitude of this output signal is proportional to a change in the amplitude of vibration of the second vibrating bars 14 and 15.

The synchronous detection circuit 64 is a circuit for performing synchronous detection of the alternating voltage signal output from the differential amplifier 63 using as a detection signal the pulse signal with shift of phase of 900 relative to the excitation signal from the driving circuit 53 and thereafter performing an integration process, which is a circuit obtained by adding an integrating circuit to a normal synchronous detection circuit. Since the Z-directional vibration due to leakage of X-excitation is in the same phase as the excitation and the Z-directional vibration due to the Coriolis' force has the shift of phase of 90° relative to the excitation, the synchronous detection and integration results in making the former always zero and making the latter be an integration value of full-wave rectification. Namely, the voltage of the output signal from the synchronous detection circuit 64 indicates the amplitude of the Z-directional vibration of the second vibrating bars 14 and 15 due to the Coriolis' force.

The angular velocity calculating circuit 70 is a circuit for calculating the angular velocity of rotation about an axis parallel to the Y-axis of the vibrator 10 from the relation between the angular velocity and the Coriolis' force as described below, based on the output signal from the detecting circuit 60 indicating the amplitude of vibration of the second vibrating bars 14 and 15.

Next described is the operation of the angular velocity detecting apparatus constructed as described above. The excitation circuit 50 outputs the excitation signal of the frequency coincident with the X-directional natural frequency $f_{X1}$ (which will be referred to as first natural frequency) of the first vibrating bars 12, 13, from the driving circuit 53. This vibrates the first vibrating bars 12, 13 at the natural frequency $f_{X1}$ in the X-directions by the inverse piezoelectric effect. The phases of the vibrating bar 12 and the vibrating bar 13 are opposite to each other as described above.

When in this state the vibrator 10 rotates at the angular velocity ω about the axis parallel to the Y-axis (including the Y-axis), the Coriolis' force F expressed by F=2mV·ω is generated in the Z-direction in the first vibrating bars 12, 13. Here, m is the mass of vibrating bar and V is the vibrating velocity. This generation of the Coriolis' force causes the first vibrating bars 12, 13 to vibrate in the Z-directions with the shift of phase of 90° relative to the X-directional vibration. Namely, the first vibrating bars 12, 13 also vibrate at the excitation frequency (the first natural frequency) and in mutually opposite phases in the Z-directions. Since this frequency is almost coincident with the coupled natural frequency of the first and second vibrating bars in the Z-directions, the vibration is efficiently transmitted to the second vibrating bars 14, 15.

On the other hand, the X-directional excitation given to the first vibrating bars 12, 13 leaks as Z-directional vibration of the same phase, and this vibration is also transmitted to the second vibrating bars 14, 15 by coupling. The vibration energy of the leakage vibration is far greater than that of the vibration due to the Coriolis' force, the Z-directional vibration of the second vibrating bar is superposition of the vibration due to the Coriolis' force with the shift of phase of 90° on the leakage vibration. Only the vibration due to the Coriolis' force is selectively detected from the Z-directional vibration of the second vibrating bars by the detecting circuit 60, as described above.

Incidentally, in this embodiment vibration occurs in opposite phases at the horizontal direction position (at the X-direction position) and in opposite phases at the vertical direction position (at the Y-direction position) as to the Z-directional vibration. In this vibration mode swinging force in the same phase as the excitation, about the rotation center of the Y-axis passing the supporting rod 16 is applied to the vibrator base 11. Against it, the torsional rigidity of the supporting rod 16 is adjusted so as to have moderate flexibility against torsional force, which prevents the leakage of vibration energy as well buffering the swinging force acting on the vibrator base 11. The torsional rigidity is also called twist rigidity, which is given by a ratio of torsional moment and torsional angle in torsion of a bar and which is determined by the shape and rigidity of the bar. In the present embodiment the torsional rigidity can be adjusted by adjusting the length of the supporting rod 16. In the present embodiment the length of the supporting rod 16 is longer than that of the second vibrating bars 14, 15, thereby giving flexibility to the torsional rigidity.

It can be deduced that if moments of inertia of the first and second vibrating bars coaxially paired are coincident with each other no swing energy will appear on the vibrator base 11. It is, however, practically difficult to make the moments of inertia thereof precisely coincident with each other because of various conditions and it is thus not easy to suppress the energy of swing on the vibrator base 11 to completely zero. It is thus desirable to consider the torsional rigidity of the supporting rod 16 as also taking coincidence of the moments of inertia of the first and second vibrating bars into consideration.

Since the vibrator base 11 is linked at one position with the supporting rod 16, no stress is applied from the supporting rod 16 to the vibrator base 11 even with expansion or contraction of each element of the vibrator due to the change in the ambient temperature. Accordingly, the leakage amount of the vibration transmitted through the vibrator base 11 to the supporting rod 16 is free of influence of the temperature change.

Incidentally, since the excitation circuit 50 excites and vibrates the first vibrating bars 12, 13 in mutually opposite phases in the X-directions, a stress concentration portion 150 is made between the two first vibrating bars in the vibrator base 11 on the first vibrating bar 12, 13 side (see FIG. 1A). Supposing the supporting rod 16 should project in the direction of −Y from the stress concentration portion 150, X-directional position deviation of the supporting rod 16 would generate horizontally (X-directionally) vibrating force in the supporting rod 16. If this force vibrates the supporting rod 16 horizontally, a difference will appear between amplitudes of vibration of the first vibrating bars 12 and 13, which will degrade the detection accuracy. When the supporting rod 16 is assumed to project from the stress concentration portion 150, the stress concentration portion 150 would spread into the supporting rod 16 to generate an unnecessarily stress-dispersed portion, which would lower the transmission efficiency between the left and right vibrating bars, thus lowering the Q value. Further, the vibration leak is regulated by giving flexibility to the supporting rod 16, but the vibration leak cannot be suppressed perfectly and leakage, though a little, occurs. If the stress concentration portion 150 is linked with the supporting rod 16, an amount of this leakage will be affected by the stress due to excitation, which will make the detection accuracy unstable.

The present embodiment is, however, free of the above problem, because the supporting rod 16 is provided on the second vibrating bar 14, 16 side of the vibrator base 11 whereby the stress concentration portion 150 and the supporting rod 16 are thus separated from each other.

In the present embodiment the second vibrating bars 14, 15 are more slender and longer than the first vibrating bars 12, 13, but, inversely, the first vibrating bars 12, 13 excited to vibrate in the X-directions may be constructed as more slender and longer than the second vibrating bars 14, 15. In that case, the electrodes for detection 25 to 28, 35 to 38, which were provided on the second vibrating bars 14, 15, are desirably provided on the first vibrating bars 12, 13.

Figure 6:
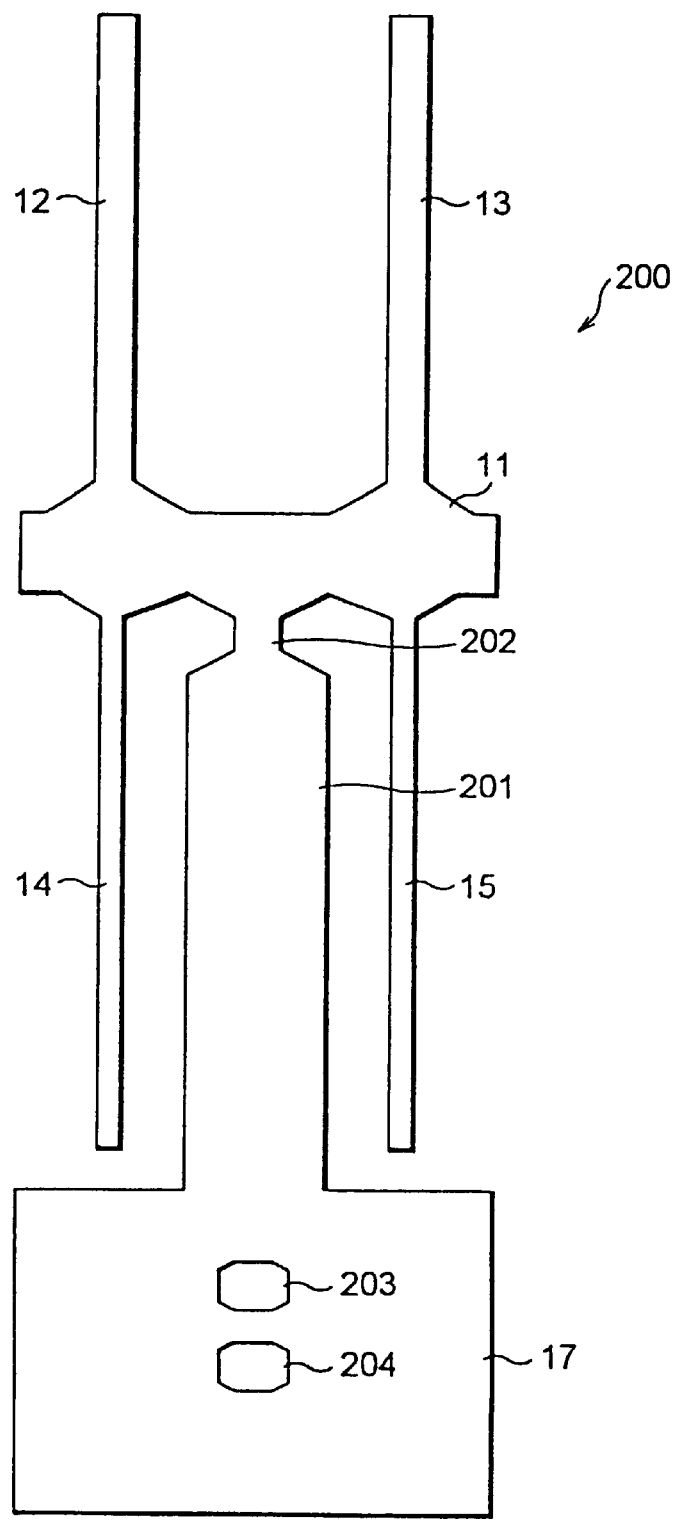
FIG. 6 is a plan view to show another embodiment of the vibrator.

FIG. 6 is a plan view to show another embodiment of the vibrator. This vibrator 200 is characterized in that the supporting rod 201 is provided with a constricted portion 202. It was already described that the wires for connecting the electrodes provided on the vibrating bars 12 to 15 with the external processing circuits were disposed on the supporting rod. These wires are desirably as thick as possible to decrease the impedance and are separated farther from each other in order to reduce influence of crosstalk. With consideration from this viewpoint, the width of the supporting rod is preferably as wide as possible. Simple expansion of the width, however, will result in increasing the torsional rigidity so as to cause reduction in the Q value. By employing such an arrangement that the supporting rod 201 has the wide width as a whole and is provided with the constricted portion 202 as shown in FIG. 6, crosstalk between the wires can be suppressed as much as possible while maintaining the flexibility of torsional rigidity. If the vibrator 200 is made using the same Z plate of quartz as the vibrator 10 of the first embodiment was and if it has the vibrator base and vibrating bars formed in the same directions, the vibrator 200 having the supporting rod 201 with the constricted portion 202 notched at about 30° relative to the X-direction as illustrated can be fabricated on a very stable basis. This results from the relation between the crystallographic orientations and the etching directions.

The fixed plate 17 of this vibrator 200 is provided with through holes 203 and 204 and a metal is evaporated onto the side walls of these through holes 203 and 204. They can be used effectively as wiring between the upper and lower faces of vibrator.

A variety of modifications can be contemplated as to packaging of vibrator 10. For example, the bonding pads 81 to 84 of vibrator 10 and the bonding pads 131 to 134 of metallized substrate 100 were connected by the bonding wires 121 to 124, but, instead thereof, they may be connected by providing the bonding pads 81 to 84 of vibrator 10 on the back surface of the fixed plate 17 and, in welding of the fixed plate 17 to the metallized substrate 100, simultaneously effecting die bonding of the bonding pads 81 to 84 to the bonding pads 131 to 134 of the metallized substrate 100. The circuit components 111, 112 were provided on the back surface of the first layer 101 of the metallized substrate 100 in order to keep the total area small, but they may be arranged so that the area of the first layer 101 is expanded outside the sealed space and so that the circuit components are mounted on the upper surface thereof. Replacement of the lid 110 with a flat lid can decrease the cost. The lid 110 was made of the metal material for electromagnetic shield, but, instead thereof, an insulating material such as ceramics may be used while a metal film is formed over the entire surface by vapor deposition or the like. Further, the vibrator 10 was kept in the floating state from the first layer 101 by utilizing the thickness of the second layer 102, but, instead thereof, the vibrator 10 may be separated apart from the first layer 101 by forming a projected surface by a wire pattern of the first layer and welding the fixed plate 17 thereonto.

The vibrator 10 of the present embodiment is the one obtained by patterning of the Z plate of quartz, but other piezoelectric materials, for example, other piezoelectric materials such as lead zirconate titanate (PZT) or lithium niobate, may be used. Further, the vibrator 10 may be replaced by a simple vibrator of stainless steel or the like, which is vibrated by electrostrictive means instead of the electrodes.

In the angular velocity detecting apparatus of the present invention, since the torsional rigidity of the supporting rod of vibrator is adjusted to the prescribed value, the vibration leakage through the supporting rod can be suppressed. Since the vibrator base is linked at one position with the supporting rod fixed to the body to be detected, no stress is applied from the supporting rod to the vibrator base even with expansion or constriction of each element of the vibrator due to the change in the ambient temperature. Therefore, the leakage amount of the vibration transmitted through the vibrator base to the supporting rod is free of the influence of temperature change. Because of it, the vibration due to the Coriolis' force can be detected with little vibration loss and at high sensitivity. Further, since the detected value is free of the influence of disturbance such as the ambient temperature, high-accuracy and stable detection of angular velocity can be achieved.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Application No. 8-212615 (212615/1996) filed on Aug. 12, 1996 is hereby incorporated by reference.

What is claimed is:

1. An angular velocity detecting apparatus comprising:

a vibrator, wherein in an X, Y, and Z, three-dimensional, orthogonal coordinate space, said vibrator has a vibrator base extending in the X-direction on the XY plane, two first vibrating bars projecting in the direction of +Y from said vibrator base and at substantially symmetric positions with respect to a Y-directional axis passing a central portion of said vibrator base, two second vibrating bars projecting in the same direction of −Y from said vibrator base and at the same X-directional positions as said two first vibrating bars do, and a single supporting rod having prescribed torsional rigidity, formed integrally with said vibrator base to project from said vibrator base in the XY plane, and fixed at the tip thereof to a body to be detected; and an excitation unit that excites and vibrates said vibrator, a detecting unit that detects an amplitude of vibration based on Coriolis' force occurring with rotation of said vibrator excited to vibrate by said excitation unit, and an angular velocity calculating unit that calculates an angular velocity of said rotation from a magnitude of the amplitude detected by said detecting unit;

wherein said supporting rod projects in the direction of −Y from said vibrator base and said excitation unit excites and vibrates said first vibrating bars in the X-directions.

2. The angular velocity detecting apparatus according to claim 1, wherein said vibrator base and said first and second vibrating bars forming said vibrator are made of a single equal-thickness quartz substrate.

3. The angular velocity detecting apparatus according to claim 1, which comprises a metallized substrate comprising a wire for excitation to connect a circuit section of said excitation unit with an electrode for excitation provided on said first or second vibrating bars, and a wire for detection to connect a circuit section of said detecting unit with an electrode for detection provided on said first or second vibrating bars, wherein the tip of said supporting rod is welded to said metallized substrate and wherein said metallized substrate is fixed to the body to be detected.

4. The angular velocity detecting apparatus according to claim 3, wherein said vibrator is surrounded by an equipotential, electroconductive material.

5. The angular velocity detecting apparatus according to claim 1, wherein the length of said supporting rod is longer than that of said first and second vibrating bars.

6. An angular velocity detecting apparatus comprising a vibrator wherein an X, Y, and Z, three-dimensional, orthogonal coordinate space, said vibrator has a vibrator base extending in the X-direction on the XY plane, two first vibrating bars projecting in the direction of +Y from said vibrator base and at substantially symmetric positions with respect to a Y-directional axis passing a central portion of said vibrator base, two second vibrating bars projecting in the same direction of −Y from said vibrator base and at the same X-directional positions as said two first vibrating bars do, and a single supporting rod having prescribed torsional rigidity, projecting from the central portion of said vibrator base, and fixed at the tip thereof to a body to be detected;

said angular velocity detecting apparatus comprising an excitation unit that excites and vibrates said vibrator, a detecting unit that detects an amplitude of vibration based on Coriolis's force occurring with rotation of said vibrator excited to vibrate by said excitation unit and an angular velocity calculating unit that calculates an angular velocity of said rotation from a magnitude of the amplitude detected by said detecting unit;

wherein said supporting rod projects in the direction of −Y from said vibrator base and said excitation unit excites and vibrates said first vibrating bars in the X-directions.

7. The angular velocity detecting apparatus according to claim 6, wherein said vibrator and said first and second vibrating bars forming said vibrator are made of a single equal-thickness quartz substrate.

8. The angular velocity detecting apparatus according to claim 6, which comprises a metallized substrate comprising a wire for excitation to connect a circuit section of said excitation unit with an electrode for excitation provided on said first or second vibrating bars, and a wire for detection to connect a circuit section of said detecting unit with an electrode for detection provided on said first or second vibrating bars, wherein the tip of said supporting rod is welded to said metallized substrate and wherein said metallized substrate is fixed to the body to be detected.

9. The angular velocity detecting apparatus according to claim 8, wherein said vibrator is surrounded by an equipotential, electroconductive material.

10. An angular velocity detecting apparatus comprising:

a vibrator, wherein an X, Y and Z three-dimensional, orthogonal coordinate space, said vibrator has a vibrator base extending in the X-direction on the XY plane, two first vibrating bars projecting in the direction of +Y from said vibrator base and at substantially symmetric positions with respect to a Y-directional axis passing a central portion of said vibrator base, two second vibrating bars projecting in the same direction of −Y from said vibrator base and at the same X-directional positions as said two first vibrating bars do, and a single supporting rod having a prescribed torsional rigidity, formed integrally with said vibrator base to project from said vibrator base in the XY plane, and fixed at the tip thereof to a body to be detected, said vibrator base, said first vibrating bars, said second vibrating bars and said supporting rod are formed from one piece of substrate;

an excitation unit that excites and vibrates said vibrator;

a detecting unit that detects an amplitude of vibration based on Coriolis's force occurring with rotation of said vibrator excited to vibrate by said excitation unit;

an angular velocity calculating unit that calculates an angular velocity of said rotation from a magnitude of the amplitude detected by said detecting unit; wherein said supporting rod projects in the direction of −Y from said vibrator base and said excitation unit excites and vibrates said first vibrating bars in the X-directions.

11. The angular velocity detecting apparatus according to claim 10, wherein said vibrator and said first and second vibrating bars forming said vibrator are made of a single equal-thickness quartz substrate.

12. The angular velocity detecting apparatus according to claim 10, which comprises a metallized substrate comprising a wire for excitation to connect a circuit section of said excitation unit with an electrode for excitation provided on said first or second vibrating bars, and a wire for detection to connect a circuit section of said detecting unit with an electrode for detection provided on said first or second vibrating bars, wherein the tip of said supporting rod is welded to said metallized substrate and wherein said metallized substrate is fixed to the body to be detected.

13. The angular velocity detecting apparatus according to claim 12, wherein said vibrator is surrounded by an equipotential, electroconductive material.

14. The angular velocity detecting apparatus according to claim 10, wherein the length of said supporting rod is longer than that of said first and second vibrating bars.

* * * * *